(12) United States Patent
Oki et al.

(10) Patent No.: US 10,498,101 B2
(45) Date of Patent: Dec. 3, 2019

(54) METHOD FOR PRODUCING ORGANIC MICRODISK STRUCTURE

(71) Applicants: KYUSHU UNIVERSITY, NATIONAL UNIVERSITY CORPORATION, Fukuoka-shi, Fukuoka (JP); NISSAN CHEMICAL INDUSTRIES, LTD., Tokyo (JP)

(72) Inventors: Yuji Oki, Fukuoka (JP); Hiroaki Yoshioka, Fukuoka (JP); Kei Yasui, Funabashi (JP); Masaaki Ozawa, Funabashi (JP)

(73) Assignees: KYUSHU UNIVERSITY, NATIONAL UNIVERSITY CORPORATION, Fukuoka-Shi (JP); NISSAN CHEMICAL INDUSTRIES, LTD., Tokyo (JP)

( * ) Notice: Subject to any disclaimer, the term of this patent is extended or adjusted under 35 U.S.C. 154(b) by 253 days.

(21) Appl. No.: 15/509,451

(22) PCT Filed: Sep. 4, 2015

(86) PCT No.: PCT/JP2015/075155
§ 371 (c)(1),
(2) Date: Mar. 7, 2017

(87) PCT Pub. No.: WO2016/039259
PCT Pub. Date: Mar. 17, 2016

(65) Prior Publication Data
US 2017/0264066 A1    Sep. 14, 2017

(30) Foreign Application Priority Data
Sep. 8, 2014    (JP) ................. 2014-181951

(51) Int. Cl.
H01S 3/06       (2006.01)
G02B 6/132      (2006.01)
(Continued)

(52) U.S. Cl.
CPC .............. *H01S 3/0627* (2013.01); *B41J 2/01* (2013.01); *C09D 11/03* (2013.01); *C09D 11/102* (2013.01);
(Continued)

(58) Field of Classification Search
CPC ........ H01S 3/0627; H01S 3/213; H01S 3/168; B41J 2/01; C23C 22/82; C09D 11/213;
(Continued)

(56) References Cited

U.S. PATENT DOCUMENTS

2005/0063175 A1    3/2005    Mizusaki et al.
2010/0054294 A1    3/2010    Yukawa et al.

FOREIGN PATENT DOCUMENTS

JP    2003-277741 A    10/2003
JP    2010-80950 A     4/2010

OTHER PUBLICATIONS

Chen, et al., Low-threshold lasing from organic and polymeric microdisk printed by room temperature atmosphere ink-jet technique, Proc. SPIE 9360, Organic Photonic Materials and Devices XVII, 936007 (Mar. 16, 2015).*
(Continued)

*Primary Examiner* — James M Mellott
(74) *Attorney, Agent, or Firm* — Birch, Stewart, Kolasch & Birch, LLP

(57) ABSTRACT

A method for producing an organic microdisk structure 40, which is characterized by comprising: a cladding layer formation step 1 wherein a cladding layer 12 is formed by printing a first ink 11 that contains a fluorine-containing hyperbranched polymer on a substrate 10 by an inkjet (Continued)

method; a core layer formation step 2 wherein a core layer 22 is formed by printing a second ink 21 that contains a laser dye and a triazine-based hyperbranched polymer containing no fluorine on the cladding layer 12 by an inkjet method; and an etching step 3 wherein the cladding layer 12 is etched using a solvent 31 that dissolves only the fluorine-containing hyperbranched polymer. Consequently, an unconventional novel method for producing an organic microdisk structure with use of an inkjet method is able to be provided.

10 Claims, 2 Drawing Sheets

(51) Int. Cl.

| | | |
|---|---|---|
| *B41J 2/01* | (2006.01) | |
| *C09D 11/03* | (2014.01) | |
| *C09D 11/102* | (2014.01) | |
| *C09D 11/107* | (2014.01) | |
| *C09D 11/328* | (2014.01) | |
| *C23C 22/82* | (2006.01) | |
| *H01S 3/213* | (2006.01) | |
| *C09D 11/38* | (2014.01) | |
| *G02B 6/12* | (2006.01) | |
| *H01S 3/16* | (2006.01) | |
| *G02B 6/293* | (2006.01) | |

(52) U.S. Cl.
CPC .......... *C09D 11/107* (2013.01); *C09D 11/328* (2013.01); *C09D 11/38* (2013.01); *C23C 22/82* (2013.01); *G02B 6/12007* (2013.01); *G02B 6/132* (2013.01); *H01S 3/168* (2013.01); *H01S 3/213* (2013.01); *G02B 6/29341* (2013.01)

(58) Field of Classification Search
CPC ..... C09D 11/38; C09D 11/102; C09D 11/107; C09D 11/328; C09D 11/03; G02B 6/12007; G02B 6/132
See application file for complete search history.

(56) References Cited

OTHER PUBLICATIONS

3rd EOS Conference on Manufacturing of Optical Components 2013, Curran Associates, 2015.*
Chen et al., "Rapid Microdisk Printing in Room Temperature Atmosphere," The 67th Joint Conference of Electrical, Electronics and Information Engineers in Kyushu, Sep. 11, 2014, pp. 516-517 (4 pages total).
Froehling, "Dendrimers and Dyes," Dyes and Pigments, vol. 48, 2001, pp. 187-195.
Grossman et al., "Direct Laser Writing for Active and Passive High-Q Polymer Microdisks on Silicon," Optics Express, vol. 19, No. 12, Jun. 6, 2011 (published May 27, 2011), pp. 11451-11456.
Grossman et al., "Low-Threshold Conical Microcavity Dye Lasers," Applied Physics Letters, vol. 97, 2010 (published online Aug. 12, 2010), pp. 063304-1-063304-3.
Grossman et al., "Strongly Confined, Low-Threshold Laser Modes in Organic Semiconductor Microgoblets," Optics Express, vol. 19, No. 10, May 9, 2011 (published May 6, 2011), pp. 10009-10016.
International Search Report (Form PCT/ISA/210) for International Application No. PCT/JP2015/075155, dated Nov. 24, 2015, with an English translation.
Liu et al., "Ink-Jet-Printed Organic Semiconductor Distributed Feedback Laser," Applied Physics Express, vol. 5, 2012 (published online Jun. 19, 2012), pp. 072101-1-072101-3 (4 pages total).
Saito et al., "Ink-Jet Process for Creating Fluorescent Microdroplet," Proc. of SPIE, vol. 7716, 2010, pp. 77161T-1-77161T-11.
Yang et al., "Highly Photo-Stable Dye Doped Solid-State Distributed-Feedback (DFB) Channeled Waveguide Lasers by a Pen-Drawing Technique," Optics Express, vol. 18, No. 21, Oct. 11, 2010 (published Oct. 4, 2010), pp. 22080-22089.

* cited by examiner

METHOD FOR PRODUCING ORGANIC MICRODISK STRUCTURE

TECHNICAL FIELD

This invention relates to a method of fabricating an organic microdisk structure. More specifically, the invention relates to a method of fabricating an organic microdisk structure using the inkjet printing process.

BACKGROUND ART

Microdisk structures and other microcavities are able to confine light at a high efficiency by repeated total reflection of the light at interfaces, making it possible to achieve high interactions between matter and light. Potential applications include microlasers capable of lasing at ultralow thresholds, optical signal processing, integrated optics, and high-sensitivity sensors such as biosensors.

As microdisk-forming materials, organic substances provide a number of advantages over inorganic substances. For example, organic substances can be doped with various dyes, in addition to which they are inexpensive and amenable to fabrication.

Up until now, organic microdisk fabrication has been carried out using primarily photolithography (see Non-Patent Documents 1 to 3), but the complexity of such processes has been a drawback.

By contrast, inkjet printing is simple and convenient. Moreover, because this process adds material only where needed, additional advantages are that it saves energy and provides a high degree of freedom.

However, because inkjet printing generally can discharge only low-viscosity inks having viscosities ranging from several mPa·s to several tens of mPa·s, achieving a high polymer concentration within the ink is a challenge. Hence, one drawback is that only thin films having thicknesses of up to about several hundred nm can be created.

This explains the absence to date of any instances of organic microdisk fabrication using the inkjet printing process.

PRIOR ART DOCUMENTS

Non-Patent Documents

Non-Patent Document 1: OPTICS EXPRESS, Vol. 19, No. 12, pp. 11451 (2011)
Non-Patent Document 2: Applied Physics Letters 97, 063304 (2010)
Non-Patent Document 3: OPTICS EXPRESS, Vol. 19, No. 10, pp. 10009 (2011)

SUMMARY OF THE INVENTION

Problems to be Solved by the Invention

In light of the above, the object of the invention is to provide a method of fabricating organic microdisk structures using the inkjet printing process.

Means for Solving the Problems

The inventors noticed that even when a hyperbranched polymer is prepared as a high-concentration solution, the relatively low viscosity enables a thick film to be produced, and thus conducted extensive investigations in order to attain the above object. As a result, they have found that, when a specific fluorinated hyperbranched polymer and a specific triazine-based hyperbranched polymer that exhibits a high refractive index are formed into a high-concentration ink, inkjet coating is possible, making such materials suitable for creating thick films by an inkjet printing process. The inventors have also found that organic microdisk structures fabricated by an inkjet process using these hyperbranched polymers and a laser dye are capable of lasing at a low threshold.

Accordingly, this invention provides:
1. A method of fabricating an organic microdisk structure, which method is characterized by comprising the steps of: forming a cladding layer by using an inkjet process to print a first ink containing a fluorinated hyperbranched polymer onto a substrate; forming a core layer by using an inkjet process to print a second ink containing a non-fluorinated triazine-based hyperbranched polymer and a laser dye onto the cladding layer; and etching the cladding layer using a solvent which dissolves only the fluorinated hyperbranched polymer;
2. The organic microdisk structure fabrication method of 1 above, wherein the fluorinated hyperbranched polymer is an acrylic hyperbranched polymer;
3. The organic microdisk structure fabrication method of 1 or 2 above, wherein the concentration of the fluorinated hyperbranched polymer in the first ink is from 5 to 20 wt %;
4. The organic microdisk structure fabrication method of any one of 1 to 3 above, wherein the concentration of the non-fluorinated triazine-based hyperbranched polymer in the second ink is from 5 to 20 wt %;
5. The organic microdisk structure fabrication method of any one of 1 to 4 above, wherein the fluorinated hyperbranched polymer has a refractive index of 1.50 or less;
6. The organic microdisk structure fabrication method of any one of 1 to 5 above, wherein the non-fluorinated triazine-based hyperbranched polymer has a refractive index of from 1.70 to 1.90;
7. An organic microdisk structure obtained by the fabrication method of any one of 1 to 6 above.
8. A microdisk laser comprising the microdisk structure of 7 above;
9. A sensor which uses the microdisk laser of 8 above; and
10. A microdisk laser which is characterized by comprising a cladding layer that contains a fluorinated hyperbranched polymer, and a core layer that contains a non-fluorinated triazine-based hyperbranched polymer and a laser dye.

Advantageous Effects of the Invention

This invention provides a novel and unprecedented method of fabricating organic microdisk structures using an inkjet printing process.

Also, because both a triazine-based hyperbranched polymer (hyperbranched polymer is abbreviated below as "HBP") expected to have a high light-confining effect and a laser dye are used in this invention, an organic microdisk laser capable of lasing at a low threshold comparable to the lasing threshold of organic microdisk lasers obtained by existing lithographic processes can be provided.

Moreover, in this invention, because all the fabrication steps can be carried out at atmospheric pressure and room temperature and under low stimulation, production via the prior addition of an organic substance—which was impossible by conventional lithographic processes that place a high burden on the sample (vacuum handling, high heat, high stimulation etching, etc.)—becomes possible, enabling
} a fabrication technique having high versatility in practical applications (biosensing devices, etc.) to be provided.

BRIEF DESCRIPTION OF THE DIAGRAMS

EMBODIMENT FOR CARRYING OUT THE INVENTION

Figure 1:
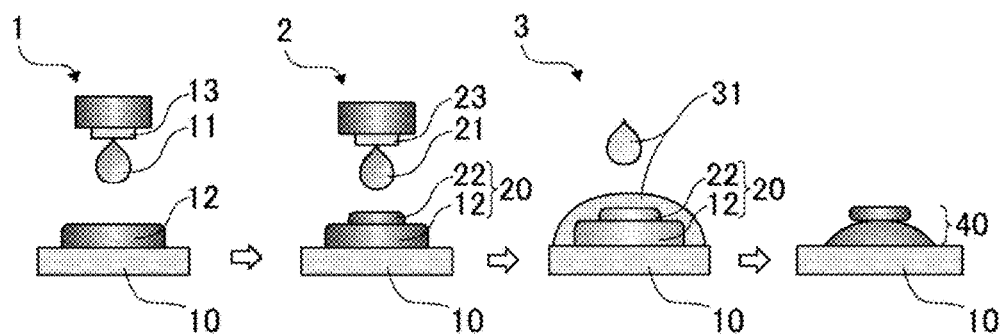
FIG. 1 is a schematic process diagram depicting the inventive method of fabricating an organic microdisk structure.

The invention is described more fully below.

The inventive method of fabricating an organic microdisk includes the steps of: forming a cladding layer by using an inkjet process to print a first ink containing a fluorinated HBP onto a substrate; forming a core layer by using an inkjet process to print a second ink containing a non-fluorinated triazine-based HBP and a laser dye onto the cladding layer; and etching the cladding layer using a solvent which dissolves only the fluorinated HBP.

In this invention, the inkjet printer used in inkjet printing is not particularly limited, and may be a continuous printer or an on-demand printer. When the inkjet printer is an on-demand printer, it may be a piezoelectric, thermal or electrostatic printer, although a piezoelectric printer is preferred.

The diameter of the inkjet nozzle is not particularly limited and may be suitably selected according to the ink viscosity and the size of the intended microdisk, although the diameter is generally from about 10 μm to about 100 μm, and preferably from 20 to 80 μm. It is preferable for the nozzle diameter at the time of cladding layer formation to be made larger than the nozzle diameter at the time of core layer formation.

The first ink used in cladding layer formation is prepared by dissolving or dispersing a fluorinated HBP in an organic solvent.

The fluorinated HBP is not particularly limited, provided it is an HBP that contains fluorine atoms, although a non-triazine-based HBP is preferred, and an acrylic HBP is more preferred.

The acrylic fluorinated HBPs disclosed in WO 2010/137724 are preferred. Of these, an acrylic HBP obtained by subjecting a monomer having two or more (meth)acrylic groups per molecule and a monomer having a fluoroalkyl group and at least one (meth)acrylic group per molecule to solution polymerization in an organic solvent and in the presence of 5 to 200 mol % of polymerization initiator, based on the total moles of monomer, is preferred.

The fluorinated HBP has a refractive index which should be lower than that of the triazine-based HBP used in the core layer, and in this invention is preferably not more than 1.5.

The weight-average molecular weight of the fluorinated HBP is not particularly limited, although in this invention, it is preferably from 1,000 to 200,000, more preferably from 2,000 to 100,000, and even more preferably from 5,000 to 60,000.

Here and below, the weight-average molecular weight in this invention is the average molecular weight obtained against a polystyrene standard in gel permeation chromatography (GPC).

Illustrative examples of monomers having two or more (meth)acrylic groups per molecule include
ethylene glycol di(meth)acrylate,
triethylene glycol di(meth)acrylate,
propylene glycol di(meth)acrylate,
neopentyl glycol di(meth)acrylate,
trimethylolpropane tri(meth)acrylate,
ditrimethylolpropane tetra(meth)acrylate,
glycerol tri(meth)acrylate,
pentaerythritol tetra(meth)acrylate,
alkoxytitanium tri(meth)acrylate,
1,6-hexanediol di(meth)acrylate,
2-methyl-1,8-octanediol di(meth)acrylate,
1,9-nonanediol di(meth)acrylate,
1,10-decanediol di(meth)acrylate,
tricyclodecane dimethanol di(meth)acrylate,
dioxane glycol di(meth)acrylate,
2-hydroxy-1-acryloyloxy-3-methacryloyoxypropane,
2-hydroxy-1,3-di(meth)acryloyloxypropane,
9,9-bis[4-(2-(meth)acryloyloxyethoxy)phenyl]fluorene,
undecylenoxy ethylene glycol di(meth)acrylate,
bis[4-(meth)acryloylthiophenyl]sulfide,
bis[2-(meth)acryloylthioethyl]sulfide,
1,3-adamantanediol di(meth)acrylate,
1,3-adamantane dimethanol di(meth)acrylate,
polyethylene glycol (molecular weight, 300) di(meth)acrylate and
polypropylene glycol (molecular weight, 500) di(meth)acrylate.

Illustrative examples of monomers having a fluoroalkyl group and at least one (meth)acrylic group on the molecule include
2,2,2-trifluoroethyl (meth)acrylate,
2,2,3,3,3-pentafluoropropyl (meth)acrylate,
2-(perfluorobutyl)ethyl (meth)acrylate,
2-(perfluorohexyl)ethyl (meth)acrylate,
2-(perfluorooctyl)ethyl (meth)acrylate,
2-(perfluorodecyl)ethyl (meth) acrylate,
2-(perfluoro-3-methylbutyl)ethyl (meth)acrylate,
2-(perfluoro-5-methylhexyl)ethyl (meth)acrylate,
2-(perfluoro-7-methyloctyl)ethyl (meth)acrylate,
1H,1H,3H-tetrafluoropropyl (meth)acrylate,
1H,1H,5H-octafluoropentyl (meth)acrylate,
1H,1H,7H-dodecafluoroheptyl (meth)acrylate,
1H,1H,9H-hexadecafluorononyl (meth)acrylate,
1H-1-(trifluoromethyl)trifluoroethyl (meth)acrylate,
1H,1H,3H-hexafluorobutyl (meth)acrylate,
3-perfluorobutyl-2-hydroxypropyl (meth)acrylate,
3-perfluorohexyl-2-hydroxypropyl (meth)acrylate,
3-perfluorooctyl-2-hydroxypropyl (meth)acrylate,
3-(perfluoro-3-methylbutyl)-2-hydroxypropyl (meth)acrylate,
3-(perfluoro-5-methylhexyl)-2-hydroxypropyl (meth)acrylate and
3-(perfluoro-7-methyloctyl)-2-hydroxypropyl (meth)acrylate.

The polymerization initiator is preferably an azo-based polymerization initiator. Illustrative include
2,2'-azobisisobutyronitrile,
2,2'-azobis(2-methylbutyronitrile),
2,2'-azobis(2,4-dimethylvaleronitrile),
1,1'-azobis(1-cyclohexanecarbonitrile),
2,2'-azobis(4-methoxy-2,4-dimethylvaleronitrile),
2-(carbamoylazo)isobutyronitrile,
2,2'-azobis{2-methyl-N-[1,1-bis(hydroxymethyl)-2-hydroxyethyl]propionamide}, 2,2'-azobis{2-methyl-N-[2-(1-hydroxybutyl)]propionamide},
2,2'-azobis[2-methyl-N-(2-hydroxyethyl)propionamide],
2,2'-azobis[N-(2-propenyl)-2-methylpropionamide],
2,2'-azobis(N-butyl-2-methylpropionamide),
2,2'-azobis(N-cyclohexyl-2-methylpropionamide),
2,2'-azobis[2-(2-imidazolin-2-yl)propane] dihydrochloride,
2,2'-azobis[2-(2-imidazolin-2-yl)propane] Bisulfate dihydrate,
2,2'-azobis[2-[1-(2-hydroxyethyl)-2-imidazolin-2-yl]propane] dihydrochloride,
2,2'-azobis[2-(2-imidazolin-2-yl)propane],
2,2'-azobis(1-imino-1-pyrrolidino-2-methylpropane) dihydrochloride,
2,2'-azobis(2-methylpropionamidine) dihydrochloride,
2,2'-azobis[N-(2-carboxyethyl)-2-methylproplonamidine] tetrahydrate,
dimethyl 2,2'-azobisisobutyrate,
4,4'-azobis-4-cyanovaleric acid,
2,2'-azobis(2,4,4-trimethylpentane),
1,1'-azobis(1-acetoxy-1-phenylethane),
dimethyl 1,1'-azobis(1-cyclohexane carboxylate),
4,4'-azobis(4-cyanopentanoic acid),
4,4'-azobis(4-cyanopentanoic acid-2-(perfluoromethyl)ethyl),
4,4'-azobis(4-cyanopentanoic acid-2-(perfluorobutyl)ethyl) and
4,4'-azobis(4-cyanopentanoic acid-2-(perfluorohexyl)ethyl).
Dimethyl 2,2'-azobisisobutyrate and
2,2'-azobis(2,4,4-trimethylpentane) are preferred.

Organic solvents that may be used in polymerization include aromatic hydrocarbon solvents such as benzene, toluene, xylene, ethylbenzene and tetralin; aliphatic or alicyclic hydrocarbon solvents such as n-hexane, n-heptane, mineral spirits and cyclohexane; halogenated hydrocarbon solvents such as methyl chloride, methyl bromide, methyl iodide, methylene dichloride, chloroform, carbon tetrachloride, trichloroethylene, perfluoroethylene and o-dichlorobenzene; ester or ester ether-type solvents such as ethyl acetate, butyl acetate, methoxybutyl acetate, methyl cellosolve acetate, ethyl cellosolve acetate and propylene glycol monomethyl ether acetate; ether-type solvents such as diethyl ether, tetrahydrofuran, 1,4-dioxane, methyl cellosolve, ethyl cellosolve, butyl cellosolve and propylene glycol monomethyl ether; ketone-type solvents such as acetone, methyl ethyl ketone, methyl isobutyl ketone, di-n-butyl ketone and cyclohexanone; alcohol-type solvents such as methanol, ethanol, n-propanol, isopropanol, n-butanol, isobutanol, tert-butanol, 2-ethylhexyl alcohol and benzyl alcohol; amide-type solvents such as N,N-dimethylformamide and N,N-dimethylacetamide; sulfoxide solvents such as dimethylsulfoxide; and heterocyclic compound-type solvents such as N-methyl-2-pyrrolidone. These may be used singly, or two or more may be used in combination.

The temperature of the polymerization reaction is preferably from 50 to 200° C., and more preferably from 70 to 150° C.

The organic solvent used to prepare the first ink is preferably one capable of dissolving fluorinated HBP. Such organic solvents are exemplified by the polymerization solvents mentioned above, with ether-based solvents such as 1,4-dioxane being especially preferred.

From the standpoint of achieving a thick film by application via inkjet printing, the concentration of fluorinated HBP in the first ink is preferably from 5 to 20 wt %, and more preferably from 7 to 15 wt %.

The viscosity of the first ink is not particularly limited, provided it is a viscosity at which application by inkjet printing is possible. However, the viscosity at the above-indicated fluorinated HBP concentration and 25° C. is preferably from 1 to 30 mPa·s, and more preferably from 3 to 20 mPa·s.

Also, because the cladding layer produced with the first ink serves as the pedestal on which the core layer will be formed, a low viscosity (of about 20 mPa·s) is preferable for enhancing the flatness of the surface.

The substrate on which the cladding layer is formed using the first ink is not particularly limited, provided it has resistance to the solvent included in the first ink and to the etchant used in the subsequent etching step. For example, a glass substrate, quartz substrate, ITO substrate, IZO substrate, substrate made of metal or metal oxide, or a resin substrate made of polyethylene terephthalate (PET) or the like may be used. In this invention, a resin substrate made of PET or the like is preferred.

Although the spot diameter when inkjet printing the first ink onto a substrate varies also with the diameter of the inkjet nozzle used and thus cannot be strictly specified, in this invention it is typically from about 100 μm to about 500 μm, preferably from about 150 μm to about 350 μm, and even more preferably from about 220 μm to about 320 μm.

Inkjet printing when forming the cladding layer may be carried out as a single shot or as a plurality of shots. However, to form a cladding layer that is sufficiently thick, has a surface area which can entirely encompass the core layer and has a flat surface, it is preferable to repeatedly build up the layer by printing from 2 to 10 shots, and preferably from 3 to 7 shots.

The thickness of the cladding layer is not particularly limited, but is generally from about 0.5 μm to about 3 μm.

The second ink used in forming the core layer is prepared by dissolving or dispersing a non-fluorinated triazine-based HBP and a laser dye in an organic solvent.

The non-fluorinated triazine-based HBP is preferably a high-refractive-index triazine ring-containing HBP mentioned in WO 2010/128661. Of these, HBPs having a recurring unit structure of the following formula are preferred because they have a high refractive index.

[Chemical Formula 1]

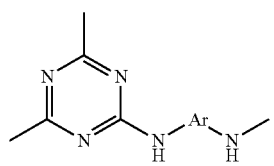

In this formula, Ar is one of the groups having the following formulas.

[Chemical Formula 2]

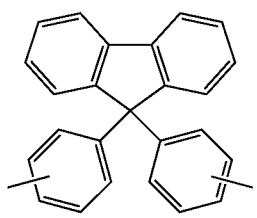

-continued

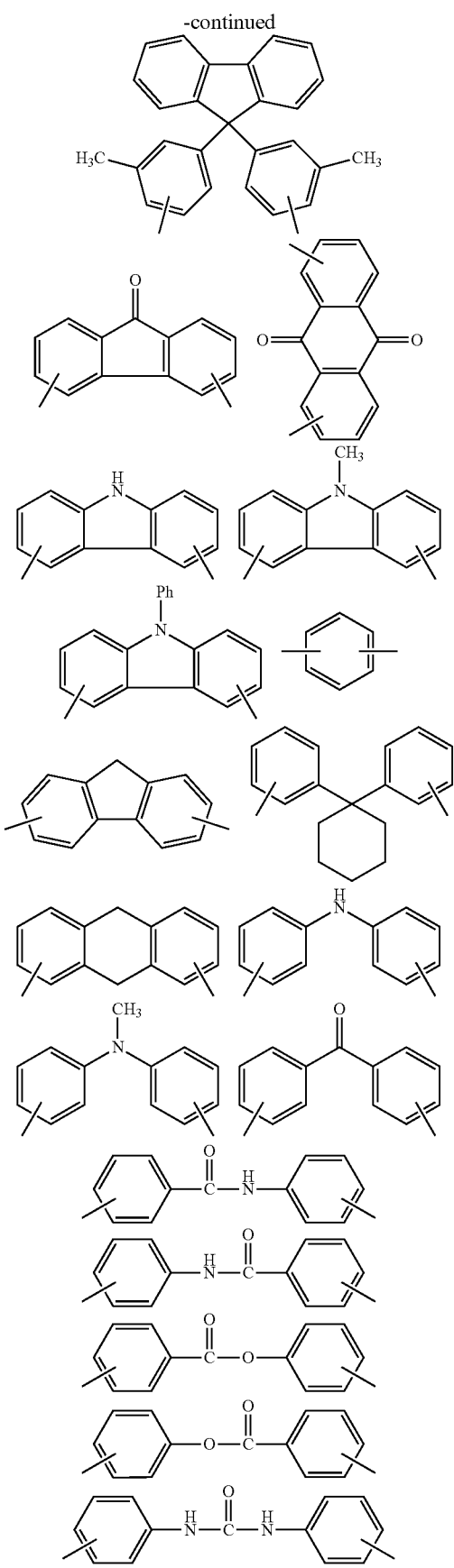

In particular, taking into account the balance between the high refractive index and the solubility in organic solvents, preferred Ar groups are those having the following formulas.

[Chemical Formula 3]

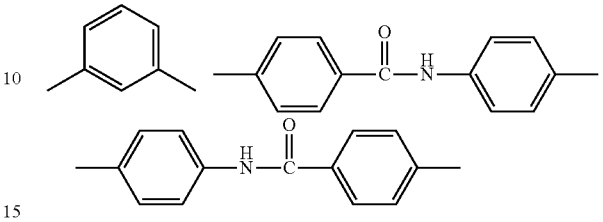

The refractive index of the triazine-based HBP is preferably at least 1.65. To further increase the light-confirming effect, the refractive index is more preferably from 1.70 to 1.90.

The weight-average molecular weight of the triazine-based HBP is preferably from 500 to 500,000. To further increase the solubility and lower the viscosity of the second ink, the weight-average molecular weight is preferably not more than 50,000, more preferably not more than 30,000, and even more preferably not more than 10,000.

The triazine-based HBP used in this invention can be produced by the method described in WO 2010/128661. For example, a triazine-based HBP having an m-phenylene group as the Ar group can be obtained by reacting a cyanuric halide with m-phenylenediamine in a suitable organic solvent.

The organic solvent at this time is exemplified in the same way as above.

The organic solvent used to prepare the second ink is preferably one capable of dissolving triazine-based HBPs. Such organic solvents are exemplified by the above polymerization solvents, with ketone solvents such as cyclohexanone being especially preferred.

From the standpoint of achieving a thick film by application via inkjet printing, the concentration of triazine-based HBP in the second ink is preferably from 5 to 20 wt %, and more preferably from 7 to 15 wt %.

The viscosity of the second ink is not particularly limited, provided it is a viscosity at which application by inkjet printing is possible. However, the viscosity at the above triazine-based HBP concentration and 25° C. is preferably from 1 to 30 mPa·s, and more preferably from 3 to 20 mPa·s.

Also, a low viscosity (of about 20 mPa·s) is preferable as well for enhancing the flatness of the disk surface required for low-threshold lasing.

The laser dye used in the second ink is not particularly limited, and may be suitably selected from among hitherto known dyes.

Illustrative examples include condensed carbocyclic dyes such as anthracene derivatives, tetracene derivatives, pyrene derivative, rubrene derivatives, decacyclene derivatives and perylene derivatives; xanthene dyes, cyanine dyes, coumarin dyes, quinacridone dyes, squarylium dyes, styryl dyes, phenoxazone dyes, metal or nonmetal phthalocyanines, benzidines, iridium complexes, and metal complexes composed of a center metal consisting of aluminum, zinc, beryllium or a rare-earth metal and ligands. Organic dyes are preferred.

These dyes may be acquired as commercial products. Illustrative examples of commercial products include LDS 698, 720, 722, 730, 750, 751, 759, 765, 798, 821, 867, 925, 950, Coumarin 440, 445, 450, 456, 460, 461, 478, 480, 481, 485, 487, 490, 498, 500, 503, 504, 504T, 510, 515, 519, 521, 521T, 522B, 523, 525, 535, 540, 540A and 545 (all from INDECO, Inc.).

The concentration of dye in the second ink is not particularly limited. In this invention, the dye concentration in the ink is typically from about 0.1 to about 10 mM, preferably from about 0.5 to about 5 mM, and more preferably from about 1 to about 3 mM.

Although the spot diameter when inkjet printing the second ink onto the cladding layer varies also with the diameter of the inkjet nozzle used and thus cannot be strictly specified, because it is preferably smaller than the spot diameter in the cladding layer, in this invention it is typically from about 10 µm to about 200 µm, preferably from about 50 µm to about 150 µm, and even more preferably from about 50 µm to about 120 µm.

Inkjet printing when forming the core layer may be carried out as a single shot or as a plurality of shots. However, when the second ink of the invention is used, a core layer of sufficient thickness can be formed by printing a single shot.

The thickness of the core layer is not particularly limited, but is generally from about 0.5 µm to about 3 µm.

After a stack consisting of the cladding layer and the core layer has been produced by inkjet printing in the above manner, the cladding layer is etched using a solvent that preferentially dissolves the fluorinated HBP, thereby producing an organic microdisk structure of the desired shape.

The solvent (etchant) used in the etching step is not particularly limited, provided it is a solvent that preferentially dissolves the fluorinated HBP, although the use of an ether-based solvent such as 1,4-dioxane is preferred.

The number of etches is not particularly limited. Generally, etching for a period of 0.1 to 10 seconds, preferably 0.5 to 2 seconds, is carried out from one to five times using 0.1 to 1 µL, preferably 0.1 to 0.5 µL, of solvent each time.

A suitable means such as washing or suction may be used to remove the solvent.

The organic microdisk structure obtained by the fabrication method of the invention, because it uses a triazine-based HBP that is expected to have a high light-confining effect, functions as an organic microdisk laser which is capable of lasing at a low threshold comparable to that of organic microdisk lasers obtained by conventional lithographic techniques.

This organic microdisk laser, by utilizing such characteristics, can be advantageously used in microlasers capable of ultralow-threshold lasing, optical signal processing, integrated optics, and high-sensitivity sensors such as biosensors.

EXAMPLES

Production Examples and Working Examples are given below to more concretely illustrate the invention, although the invention is not limited by these Examples. The equipment used in the Examples was as follows.
[1] Inkjet Printing
  Equipment: Combined equipment included an inkjet head (IJK-2005, from Microjet Corporation), a high-precision desktop robot (SHOTmini SL, from Musashi Engineering, Inc.), a piezo driver (MC6, from Hantec Ltd.) and a pressure driver (CNO3, from SMC).

The inkjet printing process was carried out at room temperature (25° C.) and atmospheric pressure.

During printing of the cladding layer and the core layer, the gap between the substrate and the inkjet nozzle was maintained at about 1 mm.

Movement of the inkjet head was set to a low speed of 2 mm/s so as to minimize disruption of the discharged ink due to air turbulence.
[2] Measurement of Laser Emission Spectrum
  Equipment: The optical system used for measurement included an excitation light source (PNG-002025-040, from Nanolase SA), an observation microscope (ECLIPSE TE2000-U, from Nikon Corp.) and a spectroscope (HR4000, from Ocean Optics).

The lasing characteristics of the microdisk laser were evaluated at room temperature (25° C.).

Production Example 1

Preparation of First Ink

Using a procedure similar to that in Working Example 1 of WO 2010/137724, a fluorinated acrylic-based HBP synthesized from ethylene glycol dimethacrylate, 1H,1H,5H-octafluoropentyl methacrylate and methyl 2,2'-azobisisobutyrate was dissolved in 1,4-dioxane, thereby preparing a first ink having a concentration of 10 wt %.

Production Example 2

Preparation of Second Ink

Using a procedure similar to that in Working Example 98 of WO 2010/128661, a triazine-type HBP synthesized from m-phenylenediamine, 2,4,6-trichloro-1,3,5-triazine and aniline, and the laser dye LDS798 (Exiton) were both dissolved in cyclohexanone, thereby preparing a second ink having a polymer concentration of 10 wt % and containing 2 mM of dye.

Working Example 1

Fabrication of Microdisk Structure (1) Cladding Layer-Forming Step
  As shown in FIG. 1, using a 70 µm diameter inkjet nozzle 13, printing was carried out by discharging and building up five shots of the first ink 11 obtained in Production Example 1 onto a PET substrate 10 so as to form a cladding layer 12 having a spot diameter of 250 to 300 µm.
(2) Core Layer-Forming Step
  Next, using a 50 µm diameter inkjet nozzle 23, the second ink 21 prepared in Production Example 2 was discharged and printed as a single shot onto the center of the cladding layer 12 formed above, thereby forming a core layer 22 having a spot diameter of about 100 µm and producing a stack 20 of the cladding layer 12 and the core layer 22.
(3) Etching Step
  Using 1,4-dioxane as the etchant 31, the operation of carrying out a 1-second etch by charging 0.2 µL of etchant 31 per individual stack 20 in a single etching pass and then removing the etchant 31 by soaking it up with clean paper lateral to the stack 20 was repeated twice, yielding a microdisk structure 40.

The etching step was carried out manually at room temperature (25° C.) and atmospheric pressure under observation with a microscope (ECLIPSE TE2000-U, from Nikon Corp.)

Figure 2:
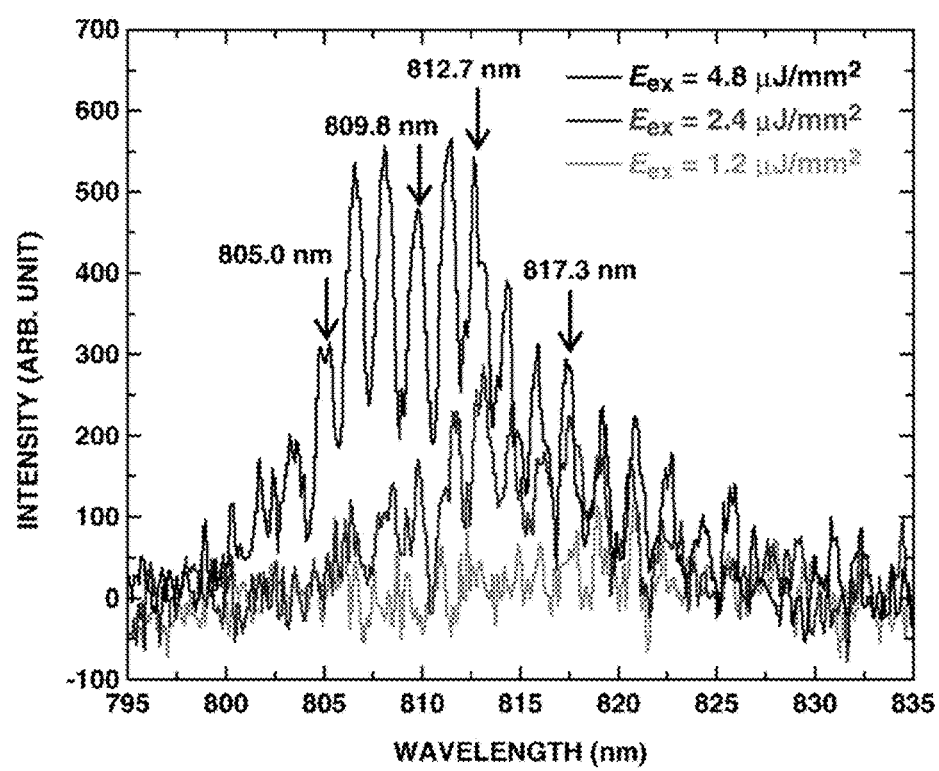
FIG. 2 shows the lasing spectrum measured for the microdisk produced in Working Example 1.
Figure 3:
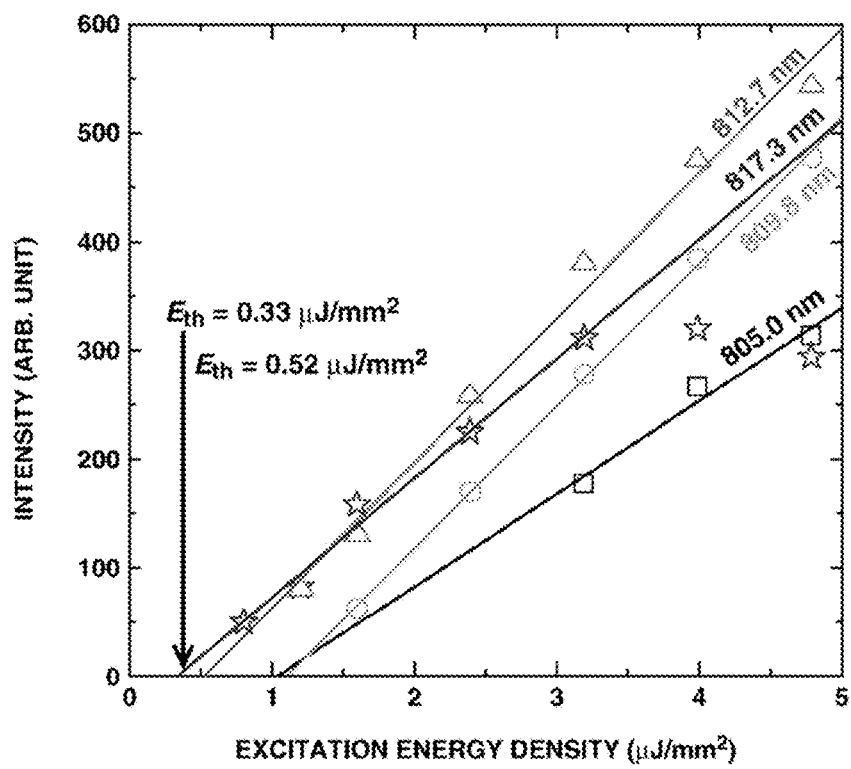
FIG. 3 is a graph showing the input/output characteristics of the microdisk produced in Working Example 1.

The lasing characteristics of the microdisk fabricated in Working Example 1 were measured and evaluated as described below. FIG. 2 shows the lasing spectrum measurement results, and FIG. 3 shows the measured input/output characteristics.

[1] Lasing Spectrum

A microdisk having a spot diameter of 75 μm was used in a microdisk cavity. A Q-switched Nd:YAG laser second harmonic wave (wavelength, 532 nm; pulse width, about 5 ns; repetition frequency, 100 Hz) was used as the excitation light source.

This light was focused to a spot diameter of 300 μm with a plano-convex lens having a focal length of 2 cm, and directed at the microdisk.

Laser light in the whispering-gallery mode (WGM) that was emitted from the edge of the microdisk cavity was collected using a microscope having a magnification of 100×, and the laser emission spectrum over an exposure time of 30 seconds was measured by using a spectrometer.

[2] Measurement of Input/Output Characteristics

The input/output characteristics in lasing evaluation were determined by using a rotating ND filter (neutral density filter) positioned between the excitation light source and the condensing lens to change the effective excitation energy density ($\mu J/mm^2$) and measure the spectrum, and plotting the spectral peaks corresponding to the effective excitation energy density. The effective excitation energy density at this time is defined based on the energy monitored between the ND filter and the condensing lens while taking into account the loss at the condensing lens.

As shown in FIG. 2, when the excitation energy density was weak, a plurality of lasing spectra having peaks near a wavelength of 820 nm were obtained. Upon increasing the excitation energy density, the lasing peaks shifted toward the short wavelength side.

At the maximum excitation energy density of 4.8 $\mu J/mm^2$, the peak wavelength was 811.5 nm. A longitudinal mode spacing of 1.55 nm was obtained at this time, which agrees with the longitudinal mode spacing when the disk circumference is treated as the resonator length.

As shown in FIG. 3, defining the lasing threshold by straight-line fitting that excludes the rise at weak excitation, a minimum threshold of 0.33 $\mu J/mm^2$ was obtained at a wavelength of 817.3 nm. This threshold is the lowest value among fundamental disk-type microcavity lasers reported to date.

REFERENCE SIGNS LIST

1 Cladding layer-forming step
2 Core layer-forming step
3 Etching step
10 PET substrate (substrate)
11 First ink
12 Cladding layer
21 Second ink
22 Core layer
31 Etchant (solvent)
40 Microdisk structure

The invention claimed is:

1. A method of fabricating an organic microdisk structure, the method comprising the steps of:
    forming a cladding layer by using an inkjet process to print a first ink containing a fluorinated hyperbranched polymer onto a substrate;
    forming a core layer by using an inkjet process to print a second ink containing a non-fluorinated triazine-based hyperbranched polymer and a laser dye onto the cladding layer; and
    etching the cladding layer using a solvent which dissolves only the fluorinated hyperbranched polymer.

2. The organic microdisk structure fabrication method of claim 1, wherein the fluorinated hyperbranched polymer is an acrylic hyperbranched polymer.

3. The organic microdisk structure fabrication method of claim 1, wherein the concentration of the fluorinated hyperbranched polymer in the first ink is from 5 to 20 wt %.

4. The organic microdisk structure fabrication method of claim 1, wherein the concentration of the non-fluorinated triazine-based hyperbranched polymer in the second ink is from 5 to 20 wt %.

5. The organic microdisk structure fabrication method of claim 1, wherein the fluorinated hyperbranched polymer has a refractive index of 1.50 or less.

6. The organic microdisk structure fabrication method of claim 1, wherein the non-fluorinated triazine-based hyperbranched polymer has a refractive index of from 1.70 to 1.90.

7. An organic microdisk structure obtained by the fabrication method of claim 1.

8. A microdisk laser comprising the microdisk structure of claim 7.

9. A sensor comprising the microdisk laser of claim 8.

10. A microdisk laser comprising a cladding layer that contains a fluorinated hyperbranched polymer, and a core layer that contains a non-fluorinated triazine-based hyperbranched polymer and a laser dye.

* * * * *